Dec. 4, 1962 C. ROSSETTI 3,066,832
DEVICES FOR DISPENSING A PRODUCT IN THE FORM OF A PASTE
Filed July 30, 1959 2 Sheets-Sheet 1

Inventor:
Charles Rossetti
By Ernest Montague
Attorney

Dec. 4, 1962 C. ROSSETTI 3,066,832
DEVICES FOR DISPENSING A PRODUCT IN THE FORM OF A PASTE
Filed July 30, 1959 2 Sheets-Sheet 2

Inventor:
Charles Rossetti
By Janett Montague
Attorney

United States Patent Office 3,066,832
Patented Dec. 4, 1962

3,066,832
DEVICES FOR DISPENSING A PRODUCT
IN THE FORM OF A PASTE
Charles Rossetti, 23 Av. Servan, Lausanne,
Vaud, Switzerland
Filed July 30, 1959, Ser. No. 830,536
Claims priority, application Switzerland Aug. 6, 1958
4 Claims. (Cl. 222—207)

The present invention relates to a device for dispensing a product in the form of a paste.

Devices for the dispensing of a product in the form of a paste from a container are known wherein the container is removably inserted into a case or the like and wherein the container is equipped with an elastic projection having a discharge opening. During the dispensing operation a pressure roller squeezes the elastic projection, the pressure roller being moved along the projection by means of a manually operated lever, the pressure roller being subjected to a spring force or the like.

The pressure mechanism of these known devices includes a guide which is adapted to flatten the end piece of the elastic projection at a predetermined point of the path of the roller in the direction towards the discharge opening and which causes, upon release of the lever, the return of the roller in opposite direction.

Certain pastes, particularly soaps or toothpastes, dry in the atmosphere and form a plug in the discharge opening, which plug has generally a small diameter. Upon operation of the pressure mechanism, the roller, which is mechanically pressed towards the elastic projection, creates an abnormally high pressure which may have, as a consequence, a sudden dispensing of the paste, upon releasing the plug, or even a destruction of the elastic projection, if the plug consisting of dried paste sits tightly near the discharge opening of the elastic projection.

It is, therefore, one object of the present invention to provide a device for dispensing a product in the form of a paste which subjects the elastic projection slowly to pressure, whereby the drawbacks of the known devices are avoided.

It is another object of the present invention to provide a device for dispensing the product in the form of a paste wherein the draw springs or the like press the roller towards the supporting wall for the elastic projection and wherein the direction of the force exerted by the draw springs forms an acute angle against the supporting wall. The pressure exerted by the roller upon the elastic projection increases slowly, thereby, in response to the movement of the roller in the direction towards the discharge opening.

With these and other objects in view which will be understood in connection with the accompanying drawings, in which.

Figure 1:
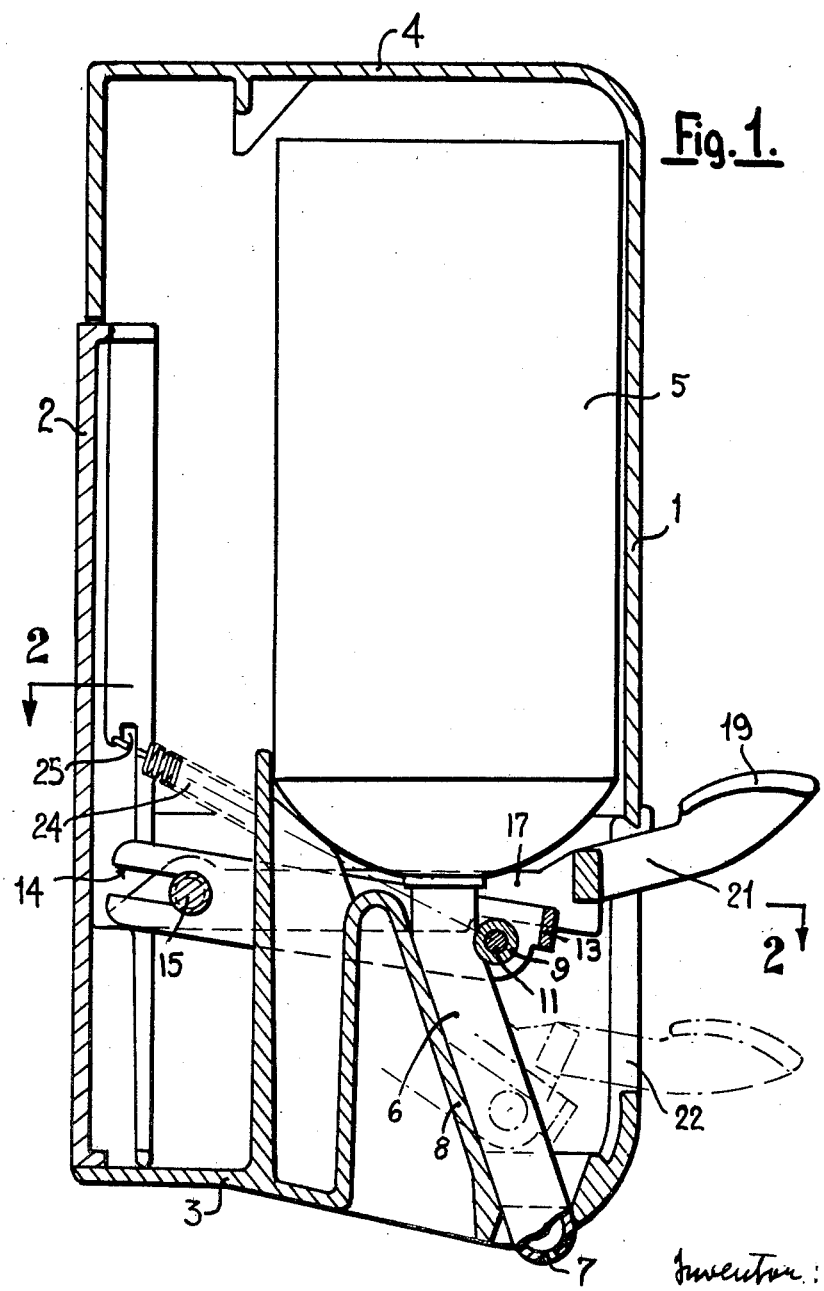
FIGURE 1 is a vertical section of the dispensing device along the line 1—1 of FIG. 2.
Figure 2:
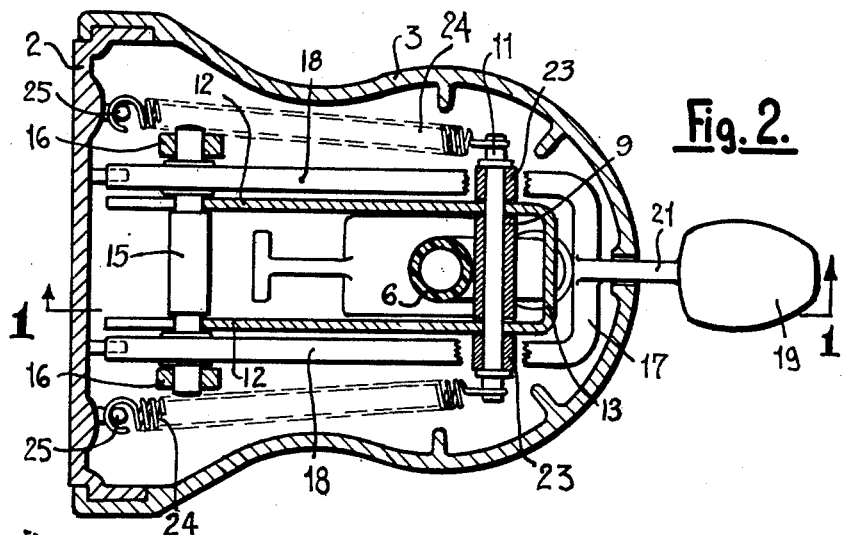
FIG. 2 is a section along the line 2—2 of FIG. 1.

Referring now to the drawings, the dispensing device comprises a case 1 formed of three parts moulded from a plastic material, namely a base plate 2 adapted to be glued or fixed in any other manner to a vertical wall, a lower part 3 glued on said base plate and in which the pressure mechanism is mounted, and a detachable cover 4 mounted slidably on the upper part of the base plate 2 and fitting on the upper edge of the part 3.

A reservoir intended to contain the product to be dispensed is disposed in the case 1, said reservoir being formed by a detachable container 5 having a flexible nozzle 6 provided at its end with a discharge aperture 7.

The nozzle 6 rests laterally against a wall 8 of the part 3, said wall 8 being slightly inclined and within the device is a pressure roller 9 intended to roll on the said nozzle 6 in order to effect ejection of a quantity of the product to be dispensed as a result of the squeezing of the nozzle 6 between the roller 9 and the wall 8.

The roller 9 is pivoted on a pin 11 disposed between the two parallel arms 12 of a metal yoke 13. The arms 12 of the yoke 13 are provided with slots 14 near their free ends, the yoke 13 being pivoted on a spindle 15 by means of the slots 14, while the spindle 15 is in turn mounted rotatably on two arms 16 provided in the lower part 3. The spindle 15 constitutes part of a control lever 17 which has two parallel arms 18 and a handle 19 disposed outside the case 1 at the end of a rod 21 which passes through the latter by a slot 22 in the lower part 3.

The lower surface of the lever 17 bears on two auxiliary rollers 23 disposed on the ends of the pin 11. Two tension springs 24 attached at one end to hooks 25 of the base plate 2 and at the other end to the pin 11 hold the yoke 13 and the lever 17 in their upper position shown in solid lines in FIG. 1. In this position, the yoke 13 bears on the spindle 15 by the base of its slots 14 in such a manner that the roller 9 does not bear substantially on the nozzle 6 and the latter can thus fill.

Hence, when a pressure is exerted on the handle 19, it is possible to bring the lever 17 into a lower position as shown in dash-dotted lines in FIG. 1. Upon movement of the lever 17 about its spindle 15, the yoke 13 is lowered. The yoke 13 can slide longitudinally in relation to the lever 17 as it is pivoted on the spindle 15 by means of the slots 14.

Figure 3:
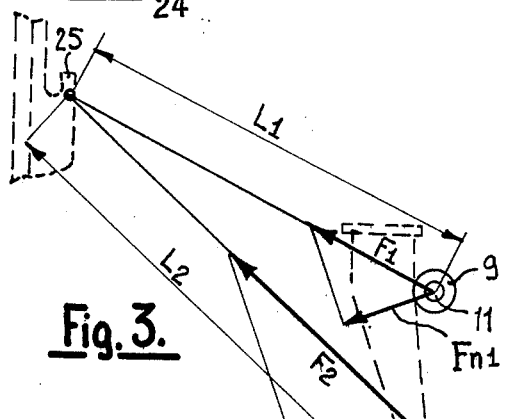
FIGS. 3 and 4 are diagram relating to the operation of the dispensing device.
Figure 4:
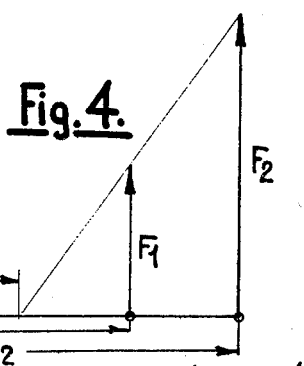

As shown diagrammatically in FIGS. 3 and 4, the springs 24 have in the upper position a length L1 equal to 140% of their free length Lo and exert a force F1 of which the component normal to the wall 8 is shown as $Fn1$ (see FIG. 3).

During this movement, the roller 9 rolls on the nozzle 6 and the length of the springs 24 increases progressively, finally reaching a length L2 equal to 180% of Lo.

As shown in the diagram in FIG. 4, the force F2 exerted by the springs 24 then rises to a value equal to twice the force F1 which they produce in the upper position.

Because of the inclination assumed by the springs 24, the component normal to the wall 8 increases to a less marked degree but, nevertheless, as indicated in FIG. 3, attains a value $Fn2$ which is equal to 150% of the component $Fn1$.

Due to the adopted arrangement, the normal pressure exerted by the roller 9 on the nozzle 6 increases progressively as the roller 9 moves in the direction towards the nozzle discharge aperture 7.

Consequently, if the flow of the product through the discharge aperture 7 becomes more difficult, because the consistency of the product to be dispensed is heavy, or the flow is even stopped due to the formation of a plug of the dried product in the aperture 7, the roller 9 can roll to a greater or lesser distance on the nozzle 6 before squeezing it with an appreciable force.

It has been found that the elastic and progressive pressure exerted by the roller saves the nozzle 6 from wear and enables the same device to be used with relatively thick products or products which are liable to dry and which in known devices cause rapid damage of the nozzle.

In fact, when the product has dried it may be necessary to actuate the handle repeatedly to soften the product in the nozzle.

Moreover, due to the progressive nature of the pressure exerted, the maximum force occurs only near the discharge aperture 7 at a point where a plug of product would be lodged in the nozzle and therefore the plug would be of smaller length.

While I have disclosed one embodiment of the present invention, it is to be understood that this embodiment is given by example only and not in a limiting sense, the scope of the present invention being determined by the objects and the claims.

I claim:

1. A device for dispensing a product in paste form comprising a case including a base plate, a container adapted to receive said product to be dispensed and releasably disposed at least partly in said case, a flexible nozzle communicating with said container and having a discharge aperture, a pressure roller rotatably mounted on a pin and engaging said flexible nozzle, a manually operated lever carrying and guiding said pressure roller in substantially axial direction of said nozzle, in order to squeeze said nozzle and to dispense a predetermined quantity of said product from said nozzle, a spindle mounted in said case and pivotally supporting said lever, helical springs operatively connected to and urging said pressure roller towards said nozzle, said case including a wall supporting said nozzle along a line thereof disposed diametrically opposite an axial line on said nozzle surface extending in the direction of movement of said roller, and one end of said helical springs being attached to said case and the other end of said helical springs being attached to said pin, said helical springs exerting an increasingly rising pressure force of said pressure roller on said nozzle during the forward movement of said pressure roller towards said discharge aperture of said nozzle, so that a paste of dense consistency is easily dispensed from said nozzle, a yoke having parallel arms, said pin being disposed between said arms, and the latter and said yoke being disposed on opposite sides of said flexible nozzle in relation to said spindle, and the latter pivotally mounting said lever.

2. The device, as set forth in claim 1, which includes means for longitudinal movement of said yoke in relation to said lever.

3. The device, as set forth in claim 2 wherein said arms of said yoke have slots at their free end, said slots constituting said means for longitudinal movement of said yoke.

4. The device, as set forth in claim 3, wherein said yoke engages in the starting position of said lever said spindle at the inner end of said slots by operation of said springs.

References Cited in the file of this patent
UNITED STATES PATENTS 2,113,022    Hefti                   Apr. 5, 1938
2,530,327    Derrick              Nov. 14, 1950